United States Patent [19]
Nagamoto et al.
[11] Patent Number: 4,777,079
[45] Date of Patent: Oct. 11, 1988

[54] IMAGE TRANSFER TYPE THERMOSENSITIVE RECORDING MEDIUM

[75] Inventors: Masanaka Nagamoto, Susono; Tetsuji Kunitake; Hirokazu Watari, both of Numazu; Junko Yamaguchi, Shizuoka, all of Japan

[73] Assignee: Ricoh Company, Ltd., Tokyo, Japan

[21] Appl. No.: 96,361

[22] Filed: Sep. 11, 1987

[30] Foreign Application Priority Data

Sep. 12, 1986 [JP] Japan ................................ 61-215355
Sep. 26, 1986 [JP] Japan ................................ 61-228906

[51] Int. Cl.$^4$ ................................................ B32B 7/02
[52] U.S. Cl. .................................... 428/212; 428/195; 428/206; 428/484; 428/488.1; 428/488.4; 428/913; 428/914
[58] Field of Search ............... 428/195, 207, 211, 484, 428/488.1, 488.4, 913, 914, 206, 212

[56] References Cited

FOREIGN PATENT DOCUMENTS 217392 12/1983 Japan ................................ 428/488.4
219086 12/1983 Japan ................................ 428/488.4

*Primary Examiner*—John E. Kittle
*Assistant Examiner*—P. R. Schwartz
*Attorney, Agent, or Firm*—Flynn, Thiel, Boutell & Tanis

[57] ABSTRACT

An image transfer type thermosensitive recording medium comprising a substrate and a double-layered thermal transfer ink layer formed thereon, which comprisees (i) a first layer formed on the substrate, comprising a thermofusible material and an oil component, which first layer melts to become a liquid having a low viscosity when heated to a predetermined temperature, the oil component comprising as the main components hydrocarbon of methane series and cycloparaffin, and having a viscosity of 100 cst or less at 40° C. and a viscosity of 20 cst or less at 100° C., and (ii) a second layer formed on the first layer, comprising a thermosoftening resin and a coloring agent, which second layer becomes soft, without being melted at the predetermined temperature or higher.

8 Claims, No Drawings

IMAGE TRANSFER TYPE THERMOSENSITIVE RECORDING MEDIUM

BACKGROUND OF THE INVENTION

The present invention relates to an image transfer type thermosensitive recording medium comprising a substrate and a double-layered thermal transfer ink layer, which is capable of recording images clearly on a recording sheet even though it has a rough surface, and has excellent preservability.

An image transfer type thermosensitive recording method is widely used as a method of recording images on plain paper by using a simple apparatus. However, the image quality obtained by this method largely depends upon the surface quality of an image receiving sheet for recording images thereon. As a matter of course, when the receiving sheet has a rough surface, it is difficult to print clear images thereon.

In order to improve the conventional image transfer type thermosensitive recording method in the above respect, for instance, the following methods have been proposed: subjecting printed images to thermal treatment as proposed in Japanese Laid-Open Patent Application No. 58-76276; using magnetic force as auxiliary means for image transfer at the time of image transfer as proposed in Japanese Laid-Open Patent Application No. 52-96549; using electrostatic force as auxiliary means for image transfer at the time of image transfer as proposed in Japanese Laid-Open Patent Application No. 55-65590; adding a large amount of an oily material to an image transfer layer, thereby decreasing the melting viscosity of the image transfer layer at the time of image transfer as disclosed in Japanese Laid-Open Patent Application No. 60-25762; increasing the thermal sensitivity of an image transfer layer by adding thereto a heat decomposable material as proposed in Japanese Laid-Open Patent Application No. 60-82389; and increasing the thermal sensitivity of an image transfer layer by adding thereto a thermally expansive material as proposed in Japanese Laid-Open Patent Application No. 60-25762.

In addition, a multi-layered thermofusible ink layer has been proposed for improvement of printed image quality, with the melting point of each layer gradually changed, with addition of a pigment to any of the layers as in Japanese Laid-Open Patent Application No. 59-224392. Furthermore, it has been proposed to form a thermofusible layer without containing therein a colorant on a thermofusible ink layer as in Japanese Laid-Open Patent Application No. 60-97888.

However, in the above-mentioned recording methods, a melted ink is transferred to an image receiving sheet when images are recorded thereon. Therefore, when the surface of the image receiving sheet is not smooth enough, the obtained printed image becomes poor in image quality. In other words, any of the above-mentioned methods still has the shortcoming that printed image quality depends upon the smoothness of the receiving sheet.

If such an ink is employed that comprises as the main component a resin which can be fused to exhibit adhesiveness while maintaining a mechanical strength to some extent, without becoming a liquid having a low viscosity, when thermal energy is applied, the ink may cover any unevenness of the surface of a receiving sheet and make it smooth when applied to the receiving sheet, even if it has a rough surface. The result will be that high printing quality may be obtained though the receiving sheet has a rough surface.

However when an ink containing such a resin is used, a larger quantity of thermal energy will be required for printing as compared with an ink containing a conventional wax, so that a support film having particularly high heat resistance may be required. In addition, the life of a thermal head for use with such ink may be short because of the use of such large quantity of thermal energy, and the accumulation of heat in the thermal head will also become a problem when used in practice.

Further thermosensitive image transfer media have been proposed in Japanese Laid-Open Patent Applications Nos. 60-239284 and 60-239285, which are capable of yielding images with clear background without reduction of image resolution. These thermosensitive image transfer media comprise a heat resistant support and an ink layer formed directly thereon, which ink layer contains a solvent having high boiling point, such as phosphate ester, phthalate ester, animal oils, vegetable oils, mineral oils, higher fatty acids, and higher alcohols. These thermosensitive image transfer media, however, have the shortcoming that the thermal sensitivity is so low that it is difficult to carry out high speed printing with application of low thermal energy. Further, in order to prevent the reduction of image resolution, it is necessary to add a large quantity of any of the above-mentioned solvents having high boiling points to the ink layer. The addition of such solvents degrades the preservability of the thermosensitive image transfer media and makes it difficult to perform smooth coating of the ink layer on the support.

Further, there is proposed in Japanese Laid-Open Patent Application No. 60-187593 a thermosensitive image transfer material comprising a support, and a first ink layer and a second ink layer which are successively formed on the support, with addition to the first ink layer of a mineral oil such as machine oil, or a vegetable oil such as castor oil, olive oil and rape oil. This thermosensitive image transfer material, however, has the shortcomings that images with clear background cannot be obtained, and the preservability of the material is poor, although excellent line images and solid images can be obtained by the first ink layer.

SUMMARY OF THE INVENTION

It is therefore an object of the present invention to provide an image transfer type thermosensitive recording medium comprising a substrate and a double-layered thermal transfer ink layer, which is capable of recording images clearly on a recording sheet even though it has a rough surface, and has high preservability.

According to the present invention, the above object is attained by an image transfer type thermosensitive recording medium comprising a substrate and a double-layered thermal transfer ink layer which comprises:

a first layer formed on the substrate, comprising a thermofusible material and an oil component, which first layer melts to become a liquid having a low viscosity when heated to a predetermined temperature, said oil component comprising as the main components hydrocarbon of methane series and cycloparaffin, and having a viscosity of 100 cst or less at 40° C. and a viscosity of 20 cst or less at 100° C., and a second layer formed on the first layer, comprising a thermo-softening resin and a coloring agent, which second layer becomes soft without being melted at the predetermined temperature or higher.

In the present invention, it is preferable that the thermo-softening resin employed in the second layer be present in the form of particles. Further, it is preferable that the thermo-softening resin have a melting viscosity of $10^3$ cp or more at 180° C.

DETAILED DESCRIPTION OF THE PREFERRED EMBODIMENTS

In the present invention, it is necessary that the first layer be easily peeled off the support at the time of thermal printing. In order to attain this, it is preferable that the first layer be constructed in such a manner that heated portions of the layer is melted to become a liquid having low viscosity and clearly cut off the remaining non-heated portions of the first layer.

It is preferable that the first layer comprise as the main component a waxlike material which is hard at room temperature and melts when heated to temperatures above room temperature.

Examples of such a waxlike material are natural waxes such as bees wax, carnauba wax, spermceti, haze wax, candelilla wax, rice bran wax and montan wax; synthetic waxes such as paraffin wax, microcrystalline wax, oxidized wax, ozocerite, ceresine, ester wax and polyethylene wax; higher fatty acids such as marganic acid, lauric acid, myristic acid, palmitic acid, stearic acid, archidic acid, and behenic acid; higher alcohols such as stearyl alcohol, and behenyl alcohol; esters such as fatty acid esters of sorbitan; and fatty amide amides such as stearamide and oleamide.

Of the above-mentioned waxlike materials, those having a peak value of 120° C. or less in differential thermal analysis, which can be melted to become a liquid having low viscosity are specifically preferable for use in the present invention.

Examples of such waxlike material are bees wax, spermceti, candelilla wax, carnauba wax, rice bran wax, montan wax, ozocerite, paraffin wax, microcrystalline wax, other modified waxes, hydrogenated waxes and long-chain fatty acids.

It is preferable that these waxlike materials be employed in an amount of 70 wt. % or more in the entire weight of the first layer.

As mentioned previously, in the first layer, an oil component comprising as the main components hydrocarbon of methane series and cycloparaffin, and having a viscosity of 100 cst or less at 40° C. and a viscosity of 20 cst or less at 100° C., is contained, by which oil component the printing performance can be improved.

It is preferable that the oil component be contained in an amount of 10 to 50 wt. % of the entire weight of the first layer. It is further preferable that the content of the hydrocarbon of methane series in the oil component be 50 wt. % or more.

With respect to the relative amount of the oil component to the amount of the thermofusible material contained in the first layer, it is preferable that the amount of the oil component be in the range of 0.1 to 1 part by weight, more preferably in the range of 0.2 to 0.7 parts by weight, to 1 part by weight of the entire thermofusible material in the first layer.

Specific examples of such oil component for use in the present invention are Crystol 52, Crystol 72, Crystol 172, and Crystol 352 made by Esso Standard.

The first layer may further contain polyamide resin, polyester resin, epoxy resin, polyurethane resin, acrylic resin, polyvinyl chloride resin, cellulose resin, polyvinyl alcohol resin, petroleum resin, phenolic resin, styrene resin, and elastomers of natural rubber, styrene-butadiene rubber, isoprene rubber and chloroprene. It is preferable that the amount of the material to be contained in the first layer be in the range of 0 to 20 wt. % of the entire weight of the first layer.

The first layer may further contain a binder resin such as polyethylene, oxidized polyethylene, polypropylene, ketone resin and ethylene vinyl-acetate copolymer. It is preferable that the amount of such binder resin to be contained in the first layer be in the range of 0 to 30 wt. % of the entire thermofusible material in the first layer.

The first layer may further contain such a pigment that can be dispersed uniformly in the thermofusible material in the first layer, but the pigment may neither dissolve in the thermofusible material nor melt when thermal energy is applied at the time of recording images. Such pigment may be a coloring pigment. By containing such pigment, the stability of the thermosensitive recording medium during storage and at the time of recording at high temperatures can be enhanced. When the pigment is a coloring pigment, the clarity of printed images can be increased.

The second layer comprises as the main component such a resin that does not have a distinct melting point, but becomes adhesive to the image receiving sheet, without becoming a liquid having low viscosity, when thermal energy is applied at the time of recording images. Such resin is hereinafter referred to as the thermo-softening resin. It is preferable that such resin be present in the form of particles in the second layer. In order to place such resin in the form of particles in the second layer, for example, one or more thermo-softening resins are dispersed in water or a solvent in which the resins are not soluble, in the presence of a surfactant or a dispersant, and the dispersion is applied to the first layer; alternatively one or more thermo-softening resins are mixed together with a coloring agent or other additives, the mixture is then thermally fused to form a solid solution, and the thus obtained solid solution is dispersed in the same manner as mentioned above, so that the dispersion is applied to the first layer.

It is preferable that such resin have a tensile strength of 20 kg/$m^2$ or more at 20° C. in accordance with Japanese Industrial Standards K 6760-1966. Further it is preferable that the such resin have a melting viscosity of $10^3$ cp or more at 180° C.

Specific examples of such a thermo-softening resin are ethylene—vinyl-acetate copolymer, ethylene—ethylacrylate copolymer and polyester resin. In addition to these resins, polyamide resin, epoxy resin, polyurethane resin, acrylic resin, vinyl chloride resin, cellulose resin, polyvinyl alcohol resin, petroleum resin, phenolic resin, styrene resin, and elastomers of natural rubber, styrene—butadiene rubber, isoprene rubber, and chloroprene rubber, can also be employed. Further, as an auxiliary material for the above resins and elastomer, adhesiveness-providing agents such as terpene resin, cumarone resin, rosin and rosin derivatives, and the waxes employed in the first layer can also be employed. It is preferable that the amount of the above resins to be contained in the second layer be 60 wt. % or less of the entire resin components in the second layer.

It is necessary that the second layer contain a coloring agent since the second layer mainly serves to record images on the image receiving sheet. The amount of the coloring agent, however, should not be excessive, but it is preferable that the amount of the coloring agent be 70 wt. % or less of the entire second layer on dry basis, in view of the thermal sensitivity at the time of recording, the preservability of the thermosensitive recording medium, and the printing quality.

The coloring agents for use in the present invention can be selected from the conventional dyes and pigments. As such dyes, basic dyes, oil-soluble dyes, acidic dyes, direct dyes and disperse dyes are preferable for use in the present invention. As such pigments, carbon black and phthalocyanine pigments can be preferably employed in the present invention.

It is preferable that the thickness of the first layer be in the range of 2~10 μm, the thickness of the second layer be in the range of 0.5~5 μm, and the total thickness of the double-layered themal transfer ink layer be in the range of 4~20 μm.

When necessary, additives such as dispersant, adhesiveness improving agent and fluidity controlling agent can be added to each of the first layer and the second layer.

As the support of the thermosensitive recording medium according to the present invention, plastic films having relatively high heat resistance, for instance, made of polyester, polycarbonate, triacetylcellulose, nylon, and polyamide, cellophane film, parchment paper, and condenser paper can be employed.

When necessary, a heat resistant protective layer, made of, for example, silicone resin, fluorine plastic, polyimide resin, epoxy resin, phenolic resin, melamine resin or nitrocellulose, may be formed on a thermal-head-contacting portion of the support. Further, a sticking preventing layer, made of wax, may be formed on such thermal-head-contacting portion of the support.

It is preferable that the thickness of the support be in the range of 2~6 μm. When the support has been treated appropriately for use in the present invention or so as to increase the thermal conductivity thereof, the thickness may range from 2 to 20 μm.

The image transfer type thermosensitive recording medium having a double-layered thermal transfer ink layer according to the present invention can be prepared by forming each layer on a support film by any of the hot-melt method, the liquid coating method and the aqueous emulsion coating method.

With reference to the following examples, the present invention will now be explained in detail. The features of this invention will become apparent in the course the following description of exemplary embodiments, which are given for illustration of the invention and not intended to limiting thereof.

EXAMPLE 1

| [Formulation of First Layer Coating Liquid] | Parts by Weight |
|---|---|
| Paraffin wax (m.p. 65° C.) | 80 |
| Liquid paraffin (Crystol 352 with a viscosity of 77 cst at 40° C., made by Esso Standard) | 20 |

The above components were mixed with application of heat thereto and the mixture was then dispersed in a ball mill for 3 hours, whereby a first layer coating liquid was prepared.

| [Formulation of Second Layer Coating Liquid] | Parts by Weight |
|---|---|
| Ethylene vinyl acetate copolymer (ethylene − vinyl acetate = 90/10) | 60 |
| Carbon black | 20 |
| Polyethylene wax (m.p. 100° C.) | 20 |
| Toluene | 300 |

The above components were placed in an attritor and dispersed with application of heat thereto, whereby a second layer coating liquid was prepared.

The first layer coating liquid was coated on a polyester film having a thickness of 3.5 μm by the hot melt coating method, so that a first layer having a thickness of 6 μm was formed on the polyester film. The second layer coating liquid was then coated on the first layer by a wire bar and dried, so that a second layer having a thickness of 3 μm was formed on the first layer, whereby an image transfer type thermosensitive recording medium No. 1 according to the present invention was prepared.

EXAMPLE 2

Example 1 was repeated except that the first layer coating liquid and the the second layer coating liquid employed in Example 1 were respectively replaced by the liquids of the following formulations, whereby an image transfer type thermosensitive recording medium No. 2 according to the present invention was prepared.

| | Parts by Weight |
|---|---|
| [Formulation of First Layer Coating Liquid] | |
| Candelilla wax (m.p. 68° C.) | 70 |
| Liquid paraffin (Crystol 52 with a viscosity of 8 cst at 40° C., made by Esso Stardard) | 25 |
| Carbon black | 5 |
| [Formulation of Second Layer Coating Liquid] | |
| Ethylene vinyl acetate copolymer (ethylene − vinyl acetate = 80/20) | 90 |
| Carbon black | 10 |

COMPARATIVE EXAMPLE 1

Example 1 was repeated except that the liquid paraffin employed in Example 1 was eliminated from the formulation of the first layer coating liquid in Example 1, whereby a comparative image transfer type thermosensitive recording medium No. 1 was prepared.

COMPARATIVE EXAMPLE 2

Example 2 was repeated except that the liquid paraffin was eliminated from the formulation of the first layer coating liquid in Example 2, whereby a comparative image transfer type thermosensitive recording medium No. 2 was prepared.

COMPARATIVE EXAMPLE 3

Example 1 was repeated except that the liquid paraffin in the formulation of the first layer coating liquid in Example 1 was replaced by rape oil, whereby a comparative image transfer type thermosensitive recording medium No. 3 was prepared.

COMPARATIVE EXAMPLE 4

Example 2 was repeated except that the liquid paraffin in the formulation of the first layer coating liquid in Example 2 was replaced by rape oil, whereby a comparative image transfer type thermosensitive recording medium No. 4 was prepared.

COMPARATIVE EXAMPLE 5

Example 1 was repeated except that the liquid paraffin in the formulation of the first layer coating liquid in Example 1 was replaced by silicone oil KF-410, whereby a comparative image transfer type thermosensitive recording medium No. 5 was prepared.

COMPARATIVE EXAMPLE 6

Example 2 was repeated except that liquid paraffin in the formulation of the first layer coating liquid in Example 2 was replaced by silicone oil KF-410, whereby a comparative image transfer type thermosensitive recording medium No. 6 was prepared.

By use of a commercially available thermosensitive printer (JP-30D made by Ricoh Company, Ltd.), thermal printing was performed on each of the above prepared thermosensitive recording media on a bond paper having a smoothness of 20 seconds, so that the printing quality and the clearness of the background obtained from each thermosensitive recording medium and the preservability of each recording medium were investigated. The results are shown in the following Table 1.

TABLE 1

| | Printing Quality (with application of low thermal energy) | Background | Preservability* |
|---|---|---|---|
| Example 1 | o | Clear | o |
| Example 2 | o | Clear | o |
| Comp. Example 1 | x | Clear | o |
| Comp. Example 2 | x | Clear | o |
| Comp. Example 3 | o | Not Clear | x |
| Comp. Example 4 | o | Not Clear | x |
| Comp. Example 5 | o | Not Clear | x |
| Comp. Example 6 | o | Not Clear | x |

(Note)
o: Excellent; x: Poor
*In the table, the preservability of each thermosensitive recording medium was evaluated by allowing each recording medium to stand in a thermostat chamber at 50° C. for one day, followed by performing thermal printing by using the thermosensitive recording medium and checking the printing quality and the clearness of the background by visual inspection.

EXAMPLE 3

[Formulation of the first layer]

| | Parts by Weight |
|---|---|
| Paraffin wax (m.p. 155° F.) | 10 |
| Candelilla wax | 10 |
| Liquid paraffin (Crystol 52 made by Esso Standard) | 8 |
| Toluene | 72 |

The above components were mixed with application of heat thereto and the mixture was then dispersed in a ball mill for 15 hours, whereby a first layer coating liquid was prepared.

[Formulation of the second layer]

| | Parts by Weight |
|---|---|
| Ethylene vinyl acetate copolymer (DB-10 made by Sumitomo Chemical Co., Ltd.) | 6 |
| Carbon black | 5 |
| Lanolin wax (m.p. 80° C.) | 1 |
| Isooctane | 88 |

A mixture of the above components was dispersed in a ball mill for 15 hours, whereby a second layer coating liquid was prepared.

The first layer coating liquid was coated on a polyester film having a thickness of 3.5 μm by the wire bar, so that a first layer having a thickness of 5 μm was formed on the polyester film. The second layer coating liquid was then coated on the first layer by a wire bar and dried, so that a second layer having a thickness of 1 μm was formed on the first layer, whereby an image transfer type thermosensitive recording medium No. 3 according to the present invention was prepared.

EXAMPLE 4

Example 3 was repeated except that Crystol 52 in the formulation of the first layer in Example 3 was replaced by Crystol 352, whereby an image transfer type thermosensitive recording medium No. 4 according to the present invention was prepared.

EXAMPLE 5

Example 3 was repeated except that carbon black in the formulation of the second layer in Example 3 was replaced by finely-divided particles prepared by fusing a mixture of carbon black and styrene acrylic copolymer resin with a weight ratio of 2:1, cooling the fused mixture and then grinding the mixture to finely-divided particles, whereby an image transfer type thermosensitive recording medium No. 5 according to the present invention was prepared.

EXAMPLE 6

Example 3 was repeated except that ethylene vinyl acetate copolymer in the formulation of the second layer in Example 3 was repaced by ethylene-ethylacrylate (A-703 made by Mitsui Dupont Chemical Co., Ltd.), whereby an image transfer type thermosensitive recording medium No. 6 according to the present invention was prepared.

COMPARATIVE EXAMPLE 7

Example 3 was repeated except that isooctane employed as the solvent of the second layer coating liquid in Example 3 was replaced by toluene, and ethylene-vinyl acetate copolymer was dissolved in toluene to prepare a dispersion, whereby a comparative image transfer type thermosensitive recording medium No. 7 was prepared.

COMPARATIVE EXAMPLE 8

Example 3 was repeated except that the first layer coating liquid in Example 3 was replaced by a coating liquid with the following formulation and the second layer was eliminated, whereby a comparative image transfer type thermosensitive recording medium No. 8 was prepared:

| [Formulation of First Layer Coating Liquid] | Parts by Weight |
| --- | --- |
| Carbon black | 5 |
| Paraffin wax (m.p. 155° F.) | 10 |
| Liquid paraffin (Crystol 52 made by Esso Standard) | 8 |
| Toluene | 67 |

The image transfer type thermosensitive recording media No. 3 through No. 6 and comparative image transfer type thermosensitive recording media No. 7 and No. 8 were subjected to a thermal printing tests on a bond paper having a Bekk's smoothness degree of 5 to 6 seconds by the previously mentioned commercially available thermosensitive printer. The result was that the image transfer type thermosensitive recording media No. 3 to No. 6 yielded clear images without non-transferred portions. In contrast to this, a comparative image transfer type thermosenstivie recording media No. 7 and No. 8 yielded images with conspicuous non-transferred portions.

What is claimed is:

1. An image transfer type thermosensitive recording medium comprising a substrate and a double-layered thermal transfer ink layer, said double-layered thermal transfer ink layer comprising:

a first layer formed on said substrate, comprising a thermofusible material and an oil component, which first layer melts to become a liquid having a low viscosity when heated to a predetermined temperature, said oil component comprising as the main components hydrocarbon of methane series and cycloparaffin, and having a viscosity of 100 cst or less at 40° C. and a viscosity of 20 cst or less at 100° C., and a second layer formed on said first layer, comprising a thermo-softening resin and a coloring agent, which second layer becomes soft, without being melted at said predetermined temperature.

2. The image transfer type thermosensitive recording medium as claimed in claim 1, wherein said thermo-softening resin is present in the form of particles in said second layer.

3. The image transfer type thermosensitive recording medium as claimed in claim 1, wherein said thermo-softening resin has a melting viscosity of $10^3$ cp or more at 180° C.

4. The image transfer type thermosensitive recording medium as claimed in claim 1, wherein the amount of said oil component is in the range of 10 to 50 wt. % of the entire weight of said first layer.

5. The image transfer type thermosensitive recording medium as claimed in claim 1, wherein the amount of said oil component is in the range of 0.1 to 1 part by weight to 1 part by weight of said thermofusible material.

6. The image transfer type thermosensitive recording medium as claimed in claim 1, wherein said thermofusible material is a waxlike material.

7. The image transfer type thermosensitive recording medium as claimed in claim 6, wherein said waxlike material is selected from the group consisting of natural waxes, synthetic waxes, higher fatty acids, higher alcohols, fatty acid esters and fatty acid amides.

8. The image transfer type thermosensitive recording medium as claimed in claim 1, wherein said thermo-softening resin is selected from the group consisting of ethylene-vinyl-acetate copolymer, ethylene-ethylacrylate copolymer, polyester resin, polyamide resin, epoxy resin, polyurethane resin, acrylic resin, vinyl chloride resin, cellulose resin, polyvinyl alcohol resin, petroleum resin, phenolic resin, styrene resin, and elastomers of natural rubber, styrene-butadiene rubber, isoprene rubber, and chloroprene rubber.

* * * * *